US012677134B2

(12) United States Patent
Kuravangi-Thammaiah et al.

(10) Patent No.: US 12,677,134 B2
(45) Date of Patent: Jul. 7, 2026

(54) SYSTEMS AND METHODS FOR OPTIMIZED IDENTITY TRANSLATION FLOW

(71) Applicant: Verizon Patent and Licensing Inc., Basking Ridge, NJ (US)

(72) Inventors: Shanthala Kuravangi-Thammaiah, Keller, TX (US); Ye Huang, San Ramon, CA (US); Lalit R. Kotecha, San Ramon, CA (US); Ali Imdad Malik, East Brunswick, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 436 days.

(21) Appl. No.: 18/184,336

(22) Filed: Mar. 15, 2023

(65) Prior Publication Data
US 2024/0314540 A1 Sep. 19, 2024

(51) Int. Cl.
*H04W 8/20* (2009.01)

(52) U.S. Cl.
CPC .................................... *H04W 8/20* (2013.01)

(58) Field of Classification Search
CPC ....... H04W 8/20; H04W 8/205; H04W 12/00; H04W 12/30; H04W 8/18; H04W 8/02
See application file for complete search history.

(56) References Cited

U.S. PATENT DOCUMENTS

| | | | | |
|---|---|---|---|---|
| 2019/0253395 A1* | 8/2019 | Bykampadi | ........... | H04W 88/16 |
| 2019/0261260 A1* | 8/2019 | Dao | ........................ | H04W 8/20 |
| 2019/0261453 A1* | 8/2019 | Jain | ........................ | H04W 8/183 |
| 2019/0306251 A1* | 10/2019 | Talebi Fard | .......... | H04W 76/10 |
| 2020/0228986 A1* | 7/2020 | Anandan | ............... | H04W 12/08 |
| 2021/0112404 A1* | 4/2021 | Xin | ......................... | H04W 8/02 |
| 2021/0243165 A1* | 8/2021 | Bykampadi | ............. | H04L 63/20 |
| 2021/0377893 A1* | 12/2021 | Khoryaev | ............. | H04L 5/0048 |
| 2022/0070702 A1* | 3/2022 | Puente Pestaña | ..... | H04L 43/065 |
| 2022/0103973 A1* | 3/2022 | Sirotkin | ................ | H04W 4/029 |
| 2024/0333623 A1* | 10/2024 | Chou | .................. | H04L 12/1407 |

* cited by examiner

*Primary Examiner* — Kashif Siddiqui

(57) ABSTRACT
In some implementations, a unified data repository (UDR) device may receive, from a network device, a request associated with a user equipment (UE). The request may indicate an external identifier of the UE. The UDR device may determine, based on the external identifier of the UE, an internal identifier of the UE. The UDR device may provide, to the network device, a request response that is in response to the request. The request response may indicate information identified via the internal identifier of the UE.

20 Claims, 5 Drawing Sheets

300

Bus
310

Processor
320

Memory
330

Input
Component
340

Output
Component
350

Communication
Component
360

410 — Receive, from a network device, a request associated with a user equipment (UE) indicating an external identifier of the UE 420 — Determine, based on the external identifier of the UE, an internal identifier of the UE 430 — Provide, to the network device, a request response that is in response to the request

400

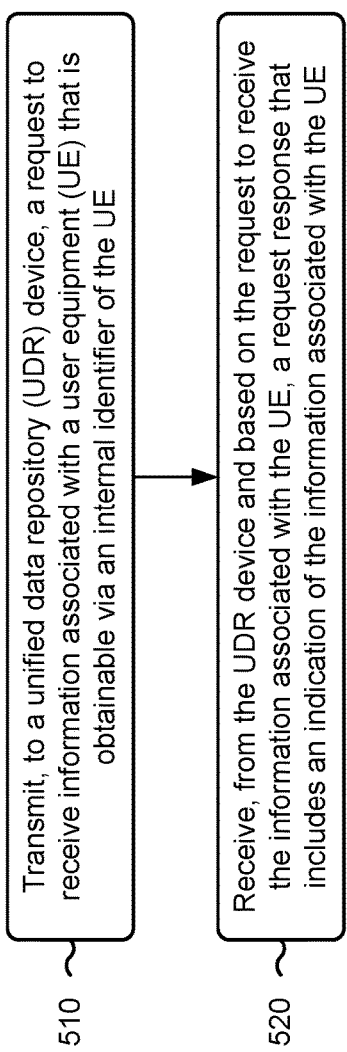

500

510 Transmit, to a unified data repository (UDR) device, a request to receive information associated with a user equipment (UE) that is obtainable via an internal identifier of the UE 520 Receive, from the UDR device and based on the request to receive the information associated with the UE, a request response that includes an indication of the information associated with the UE

FIG. 5

SYSTEMS AND METHODS FOR OPTIMIZED IDENTITY TRANSLATION FLOW

BACKGROUND

A unified data repository (UDR) device may support one or more network devices or network functions. As an example, the one or more network devices or network functions may communicate (e.g., via an interface) with the UDR device to store and/or retrieve subscription data, policy data, structured data for exposure, and/or application data, among other examples. The one or more network devices or network functions may subscribe to receive data change notifications from the UDR device (e.g., based on the UDR device determining that data associated with a subscription is updated).

BRIEF DESCRIPTION OF THE DRAWINGS

FIG. 5 is a flowchart of an embodiment of a process associated with an optimized identity translation flow.

DETAILED DESCRIPTION OF EXAMPLE EMBODIMENTS

Figure 1:
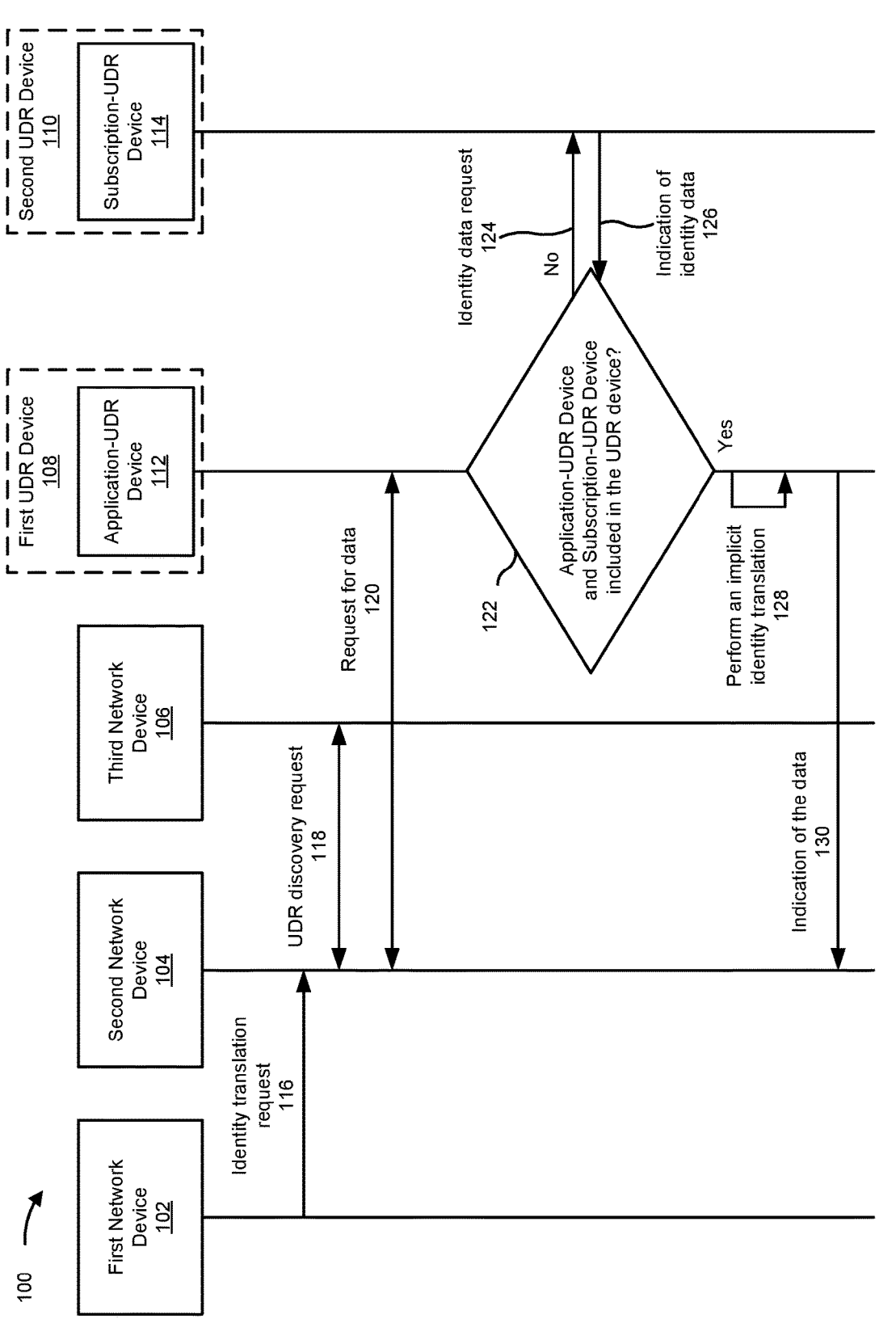
FIG. 1 is a diagram of an example embodiment associated with optimized identity translation flow.

The following detailed description of example implementations refers to the accompanying drawings. The same reference numbers in different drawings may identify the same or similar elements.

A subscriber, such as a subscriber of a mobile network operator (MNO), may be associated with a subscriber profile. The subscriber profile may include subscription data (e.g., associated with a user equipment (UE) of the subscriber). A unified data repository (UDR) device may store the subscription data associated with one or more UEs (e.g., an individual UE and/or a group of UEs) in a subscription data resource of the UDR device. The subscription data may include identity data associated with a UE.

For example, the identity data may indicate an internal identifier of the UE. An internal identifier of the UE may be an identifier of the UE that is used within a network (e.g., a wired or wireless network) to identify the UE. In some examples, the internal identifier may not be publicly available (for example, to other entities outside of the MNO). As an example, an internal identifier may include a subscription permanent identifier (SUPI), an international mobile subscriber identifier (IMSI), a network access identifier (NAS), and/or another unique identifier of the UE (e.g., that is used within the network to identify the UE).

In some cases, the MNO may assign a SUPI to a UE. The MNO may use the SUPI to manage subscriber profile and/or subscription data associated with the UE. Because the SUPI is an internal identifier, the SUPI is typically not visible to external devices and is used primarily for network-level functions (e.g., routing and/or call setup, among other examples). On the other hand, an external identifier may be a globally unique identifier of the UE, which can be used across different networks (e.g., different wired or wireless networks) and/or across different service providers (e.g., different MNOs). For example, the external identifier may be publicly available. As an example, an external identifier of the UE may include a generic public subscription identifier (GPSI). Because the GPSI is an external identifier, the GPSI is typically visible across the different networks and/or across the different service providers.

In some cases, a network device may trigger an identity translation operation or procedure to translate an external identifier of a UE to an internal identifier of the UE (e.g., to access data associated with the UE in response to a trigger and/or a communication transmitted by an external device). For example, the network device may access data associated with the UE in response to a trigger from an external application function (AF), a service request for external parameter provisioning, and/or a service request for AF-specific UE identifier retrieval, among other examples. As an example, the external AF may send a request associated with a UE to a network exposure function (NEF) device that triggers the NEF device to access the data (e.g., the application data).

However, in some cases, the external AF identifies the UE in the request associated with the UE via an external identifier of the UE (e.g., the GPSI associated with the UE) rather than an internal identifier of the UE (e.g., the SUPI of the UE and/or an internet protocol (IP) address associated with the UE) because the external AF does not have access to, or is not otherwise aware of, the internal identifier of the UE (e.g., the internal identifier is not visible to the external AF for security reasons). As an example, if the external AF identifies the UE in the request associated with the UE via the internal identifier (e.g., the SUPI), then a malicious actor that intercepts the request associated with the UE may be able to use the internal identifier to access sensitive information associated with the UE and/or the subscriber.

In some cases, a network device may trigger an identity translation operation or procedure to translate the internal identifier of the UE to the external identifier of the UE (e.g., to communicate with external devices without indicating the internal identifier). For example, if the network device receives an indication of updated data associated with a UE from another network device that identifies the UE via the internal identifier, then the network device may trigger the identity translation operation or procedure to translate the internal identifier of the UE to the external identifier of the UE before communicating with an external AF to update the data associated with the UE that is stored in the external AF. As an example, the NEF device may transmit, and the external AF may receive, an update request (e.g., to update the data associated with the UE) that identifies the UE via the external identifier of the UE rather than the internal identifier of the UE.

Accordingly, to translate the external identifier (e.g., the GPSI) of the UE to the internal identifier (e.g., the SUPI) of the UE and/or to translate the internal identifier of the UE to the external identifier of the UE, the NEF device typically triggers an identity translation operation or procedure associated with a unified data management (UDM) device. The UDM device may access subscription data (e.g., stored in a UDR device) to obtain identity data (e.g., which indicates the internal identifier) associated with the UE.

The identity translation operation or procedure (e.g., associated with translating the external identifier to the internal identifier and/or associated with translating the internal identifier to the external identifier) includes multiple steps, such as steps associated with a UDM discovery communication (e.g., associated with identifying a UDM device that is associated with the UE), a UDM group discovery communication (e.g., associated with identifying a UDM group identifier of UDM devices that are associated with the UE), a first translation result communication (e.g., associated with indicating a request, to a UDM device, to retrieve the internal identifier of the UE), a UDR discovery communication (e.g., associated with identifying a UDR device that is associated with the UE), an identity data request (e.g., associated with indicating a request, to a UDR device, to retrieve the internal identifier of the UE), an identity data response (e.g., associated with indicating the internal identifier of the UE to a UDM device), and a second translation result communication (e.g., associated with indicating the internal identifier of the UE to an NEF device).

Thus, performing operations associated with the identity translation operation or procedure consumes resources (e.g., processing resources, computing resources, and/or network resources, among other examples) because of the multiple steps that are performed during the identity translation call flow. Additionally, network performance may be negatively impacted (e.g., network resources may be consumed, and latency may be introduced when the network devices perform operations associated with the identity translation call flow) because of the multiple steps that are performed during the identity translation call flow.

Some implementations described herein enable an optimized identity translation flow (e.g., by enabling a UDR device to translate an external identifier of a UE to an internal identifier of a UE and/or by enabling the UDR device to translate the internal identifier of the UE to the external identifier of the UE, as described in more detail elsewhere herein). For example, a UDR device may receive, and a network device (e.g., an NEF device) may provide, a request associated with a UE (e.g., a request to retrieve data and/or an identity translation request) that indicates an external identifier of the UE (e.g., a GPSI of the UE) and/or an attribute (e.g., an attribute in a Hypertext Transfer Protocol (HTTP) header, an attribute in a body of the request, and/or an attribute in a JavaScript Object Notation (JSON) payload, among other examples) indicating a request to perform an identity translation operation or procedure. The UDR device may determine, based on the external identifier, an internal identifier of the UE (e.g., a SUPI of the UE and/or an IP address associated with the UE).

In some implementations, a UDR device may receive, and a network device (e.g., an NEF device) may provide, a request associated with a UE (e.g., a request to retrieve data and/or an identity translation request) that indicates an internal identifier of the UE (e.g., a IP/SUPI of the UE) and/or an attribute (e.g., an attribute in a Hypertext Transfer Protocol (HTTP) header, an attribute in a body of the request, and/or an attribute in a JSON payload, among other examples) indicating a request to perform an identity translation operation or procedure. The UDR device may determine, based on the internal identifier, an external identifier of the UE (e.g., a GPSI of the UE).

As an example, the network device may include a flag in an identity translation request (e.g., transmitted to the UDR device) indicating that identity translation is to be performed by the UDR device (e.g., in a header of the request, in a body of the request, and/or in a JSON payload). In this way, the UDR device may perform an identity translation operation or procedure even if the identity translation request indicates the internal identifier of the UE (e.g., the SUPI of the UE and/or the IP address associated with the UE). Thus, in some implementations, the UDR device may perform an identity translation only when the network device indicates that the identity translation operation or procedure is to be performed by the UDR device (e.g., in a header of the identity translation request, in a body of the identity translation request, and/or in a JSON payload associated with the identity translation request).

In some implementations, the UDR device may perform an implicit identity translation (e.g., based on an identity translation request). An implicit identity translation may be an identity translation that is performed by a single UDR device (e.g., without having to retrieve information from a separate device). As an example, the UDR device may receive, and a network device (e.g., an NRF device) may provide, an identity translation request associated with a UE. The identity translation request may identify the UE via an external identifier (e.g., the GPSI of the UE). The UDR device may translate, based on the identity translation request associated with the UE, the external identifier of the UE into an internal identifier of the UE (e.g., the SUPI of the UE).

As an example, the UDR device may map the external identifier to the internal identifier that is included in a subscription data resource of the UDR device, as described in more detail elsewhere herein. In some implementations, the UDR device may provide, and the network device may receive, a request response (e.g., in response to the identity translation request). As an example, the request response may indicate information identified via the internal identifier of the UE. As another example, the UDR device may map the internal identifier to the external identifier that is included in a subscription data resource of the UDR device, as described in more detail elsewhere herein. In some implementations, the UDR device may provide, and the network device may receive, a request response (e.g., in response to the identity translation request). For example, the request response may indicate information identified via the external identifier of the UE.

In some implementations, the UDR device may determine, based on the external identifier of the UE, the internal identifier by transmitting, to a different UDR device, a request to receive the internal identifier. As an example, the request to receive the internal identifier of the UE may indicate the external identifier of the UE. The UDR device may obtain, from the different UDR device, an indication of the internal identifier of the UE.

In some implementations, the UDR device may perform an action (e.g., by using the internal identifier of the UE and/or in association with the internal identifier). For example, the identity translation request may indicate a request to receive data (e.g., application data, policy data, structured data for exposure, and/or group identifier mapping data, among other examples) associated with the UE. As an example, the request response may include the data associated with the UE and/or the internal identifier of the UE.

In some implementations the identity translation request may be triggered by a service request. For example, the service request may include an application triggering service request, a short message service (SMS) request (e.g., a mobile station international subscriber directory number (MSISDN)-less mobile originated (MO) short message service (SMS request), an external parameter provisioning service request, and/or an AF-specific UE identifier retrieval service request, among other examples). An MSISDN is an identifier associated with identifying a user device (e.g., that sends an SMS message). Thus, for example, an MSISDNless MO SMS service request is associated with a user device that is not identifiable by an MSISDN sending and/or receiving an SMS message.

In this way, the network device may transmit, and the UDR device may receive, the identity translation request that identifies the UE via the external identifier to enable the UDR device to translate the external identifier to the internal identifier (e.g., even in cases where the network device is not aware of an internal identifier of the UE and without triggering an identity translation call flow toward the UDM device). This improves network performance (e.g., by optimizing a procedure associated with translating the external identifier to the internal identifier, reducing network transactions per second (TPS), reducing latency, optimizing UDR device data storage, optimizing UDR resource structure, reducing redundant call flows, and/or reducing application programming interface (API) utilization, among other examples). This also conserves resources (e.g., computing resources, memory resources, and/or networking resources, among other examples) that would have otherwise been used performing operations associated with the identity translation operation or procedure (e.g., because the UDR device can translate the external identifier of the UE to the internal identifier of the UE without communicating with other devices and/or by communicating with other network devices via fewer communications).

FIG. 1 is a diagram of an example 100 associated with an optimized identity translation flow. As shown in FIG. 1, example 100 includes a first network device 102, a second network device 104, a third network device 106, a first UDR device 108, and a second UDR device 110. As further shown in FIG. 1, the first UDR device 108 may include an application-UDR device 112 and the second UDR device 110 may include a subscription-UDR device 114. In some implementations, the application-UDR device 112 may store application data associated with one or more UEs (e.g., an individual UE and/or a group of UEs). The subscription-UDR device 114 may store subscription data associated with one or more UEs (e.g., an individual UE and/or a group of UEs).

Although the first UDR device 108 is described as including the application-UDR device 112 and the second UDR device 110 is described as including the subscription-UDR device 114, some other implementations may use any number of UDR devices to store data associated with one or more UEs in any suitable manner. For example, a single UDR device may be used to store data associated with one or more UEs (e.g., an individual UE and/or a group of UEs) and/or multiple UDR devices may be used to store data associated with one or more UEs (e.g., an individual UE and/or a group of UEs).

As shown in FIG. 1, and by reference number 116, the first network device 102 (e.g., an AF device) may transmit, and the second network device 104 (e.g., an NEF device) may receive, an identity translation request (e.g., associated with a UE). For example, the first network device 102 may transmit, and the second network device 104 may receive, the identity translation request in response to the first network device 102 receiving a service request transmitted by the UE. As an example, the identity translation request may identify the UE via an external identifier (e.g., a GPSI of the UE) and/or may indicate the service request associated with the UE, as described in more detail elsewhere herein.

In some implementations, the service request may be a service request for provisioning of the UE (e.g., provisioning with one or more parameters). For example, the UE may request provisioning in association with subscribing to a new service subscription (e.g., of an MNO) to enable provisioning of service parameters associated with ensuring that the new service properly functions. As an example, the UE may request provisioning of service parameters in association with a service update to enable provisioning of service parameters associated with updated features. As another example, the UE may request provisioning in association with a change in network configuration (e.g., a new access point may be introduced and/or there may be a change in authentication parameters, among other examples) to enable provisioning of service parameters associated with ensuring continued connectivity with a wireless network.

As further shown in FIG. 1, and by reference number 118, the second network device 104 may transmit, and the third network device 106 (e.g., an NRF device) may receive, a UDR discovery request. For example, the UDR discovery request may indicate an identifier of a subscriber (e.g., that is associated with the UE that transmitted the service request), a requested data type (e.g., that is to be retrieved), and/or service requirements (e.g., quality of service (QOS) requirements), among other examples. As an example, the UDR discovery request may indicate the external identifier of the UE (e.g., the GPSI), a requested data type of application data, and/or service requirement parameters (e.g., indicated in the service request for provisioning), among other examples.

The third network device 106 may process the UDR discovery request. As an example, the third network device 106 may identify the first UDR device 108 and the application-UDR device 112, which includes application data associated with the UE (e.g., based on the external identifier and the requested data type of application data indicated by the UDR discovery request). The third network device 106 may transmit, and the second network device 104 may receive, a UDR discover response. As an example, the UDR discovery response may indicate identifying information (e.g., an IP address and/or port number associated with the UDR device) of the first UDR device 108 and the application-UDR device 112, which are associated with the UE.

In some implementations, the third network device 106 may identify the second UDR device 110 and the subscription-UDR device 114, which includes subscription data associated with the UE. For example, because the UDR discovery request associated with the UE indicates only the external identifier of the UE (e.g., the internal identifier of the UE is not indicated) and a requested data type of application data, the third network device 106 may determine that information associated with the second UDR device 110 and the subscription-UDR device 114 may need to be used in subsequent communications (e.g., to retrieve the application data). As an example, the UDR discovery response may indicate identifying information (e.g., an IP address and/or port number associated with the second UDR device 110 and/or the subscription-UDR device 114) of the second UDR device 110 and the subscription-UDR device 114, which are associated with the UE.

In some implementations, the second network device 104 may analyze the UDR discovery response to determine whether to indicate an identity translation request (e.g., in association with the service request). For example, because the service request associated with the UE indicates only the external identifier of the UE (e.g., the internal identifier of the UE is not indicated) and a request to retrieve application data, then the second network device 104 may determine to indicate the identity translation request. In other words, the second network device 104 may determine to indicate the identity translation request because the internal identifier is used to access the application data. As an example, the second network device 104 may determine to indicate the identity translation request in response to receiving (e.g., transmitted by the third network device 106) information that identifies the second UDR device 110 and the subscription-UDR device 114.

As further shown in FIG. 1, and by reference number 120, the second network device 104 may transmit, and the application-UDR device 112 may receive, a request for data. As an example, the second network device 104 may transmit (e.g., via a Hypertext Transfer Protocol (HTTP) PUT communication or another application layer protocol), and the application-UDR device 112 may receive, the request for data. In some implementations, the request for data may request service parameter data included in application data (e.g., that is included in an application data resource of the application-UDR device 112). As an example, the application data resource of the UDR device may be identifiable via at least one of the external identifier of the UE or the internal identifier of the UE (e.g., the application data resource structure may be enhanced to a GPSI of a UE and/or a SUPI of a UE as an identifier).

As an example, the service parameter data may include configuration settings associated with establishing a data connection between the UE and a network (e.g., a wired or wireless network). As an example, the configuration settings may include network-related parameters (e.g., an Access Point Name (APN), IP addresses, and/or Domain Name System (DNS) servers, among other examples) and/or any other suitable parameters. In some implementations, the request for data may include an indication of an identity translation request based on determining to indicate the identity translation request, as described in more detail elsewhere herein. For example, the request for data may include a flag indicating that identity translation is to be performed by the application-UDR device 112 (e.g., in a header of the request for data, such as an HTTP header, or in a body of the request for data). As an example, the application-UDR device 112 may perform an implicit identity translation based on the identity translation request, as described in more detail elsewhere herein.

As further shown in FIG. 1, and by reference number 122, the application-UDR device 112 may determine whether the application-UDR device 112 and the subscription-UDR device 114 are included in the first UDR device 108. If the application-UDR device 112 and the subscription-UDR device 114 are not included in the first UDR device 108 (e.g., No), then the application-UDR device 112 may communicate with the subscription-UDR device 114 (e.g., which is included in the second UDR device 110) to obtain the internal identifier of the UE, as described in more detail elsewhere herein. If the application-UDR device 112 and the subscription-UDR device 114 are included in the first UDR device 108 (e.g., Yes), then the application-UDR device 112 may perform an implicit identity translation to obtain the internal identifier of the UE, as described in more detail elsewhere herein.

In some implementations, to determine whether the application-UDR device 112 and the subscription-UDR device 114 are included in the first UDR device 108, the application-UDR device 112 may query information included in the first UDR device 108. As an example, the query (e.g., of the information included in the first UDR device 108) may indicate a request to retrieve identity data that corresponds to the external identifier of the UE.

As an example, if query results indicate the identity data that corresponds to the external identifier, then the application-UDR device 112 may determine that the application-UDR device 112 and the subscription-UDR device 114 are included in the first UDR device 108. If the query results do not indicate the identity data that corresponds to the external identifier (e.g., the query results indicate an error message and/or a no results message, among other examples), then the application-UDR device 112 may determine that the application-UDR device 112 and the subscription-UDR device 114 are not included in the first UDR device 108.

In some implementations, the application-UDR device 112 may communicate with the second network device 104 to determine whether the application-UDR device 112 and the subscription-UDR device 114 are included in the first UDR device 108. As an example, the second network device 104 may have already obtained information that identifies the UDR device (e.g., the subscription-UDR device 114 included in the second UDR device 110) that stores subscription data (e.g., based on a different UDR discovery request associated with the subscription data) and may transmit the information that identifies the UDR device (e.g., the subscription-UDR device 114 included in the second UDR device 110) that stores the subscription data to the application-UDR device 112. As another example, the application-UDR device 112 may store mapping information of an associated subscription-UDR device (e.g., indicated by the UDR discovery response).

As further shown in FIG. 1, and by reference number 124, the application-UDR device 112 may transmit, and the subscription-UDR device 114 may receive, an identity data request based on a determination that the application-UDR device 112 and the subscription-UDR device 114 are not included in the first UDR device 108 (e.g., if "No", as described in connection with reference number 122 of FIG. 1 and/or as described in more detail elsewhere herein). As an example, the application-UDR device 112 may transmit (e.g., via an HTTP GET communication), and the subscription-UDR device 114 may receive, the identity data request based on the application-UDR device 112 receiving query results that do not indicate the identity data that corresponds to the external identifier.

As an example, the identity data request may indicate the external identifier of the UE and a request to retrieve the internal identifier of the UE. In some implementations, the subscription-UDR device 114 may generate, based on the identity data request, an external identifier to internal identifier mapping (e.g., a GPSI to SUPI mapping) that maps the external identifier of the UE to the internal identifier of the UE (e.g., indicated by the identity data included in the subscription data). The subscription-UDR device 114 may transmit, and the application-UDR device 112 device may receive an indication of the internal identifier of the UE, as described in more detail elsewhere herein.

As shown by reference number 126, the subscription-UDR device 114 may transmit, and the application-UDR device 112 may receive, an indication of identity data. As an example, the indication of the identity data may include an indication of the external identifier to internal identifier mapping and/or an indication of the internal identifier of the UE.

As shown by reference number 128, the application-UDR device 112 may perform an implicit identity translation (e.g., if "Yes", as described in connection with reference number 122 of FIG. 1 and/or as described in more detail elsewhere herein). In some implementations, the application-UDR device 112 may perform the implicit identity translation based on a determination that the application-UDR device 112 and the subscription-UDR device 114 are included in the first UDR device 108 (e.g., based on receiving query results that do not indicate the identity data that corresponds to the external identifier, as describe in more detail elsewhere herein).

As an example, because the application data and the subscription data are included in a single UDR device (e.g., the first UDR device 108), the application-UDR device 112 may correlate, based on the identity data, the external identifier with the internal identifier of the UE. As another example, because the application data and the subscription data are stored in a single UDR device, the application-UDR device 112 may map the external identifier to the internal identifier that is included in a subscription data resource of the UDR device.

As further shown in FIG. 1, and by reference number 130, the application-UDR device 112 may transmit, and the second network device 104 may receive, an indication of the data. For example, service parameter data. For example, the indication of the data may include the service parameter data included in application data (e.g., that is included in an application data resource of the application-UDR device 112).

In this way, the second network device 104 may transmit, and the application-UDR device 112 may receive, the identity translation request that identifies the UE via the external identifier to enable the application-UDR device 112 to translate the external identifier to the internal identifier (e.g., even in cases where the network device is not aware of an internal identifier of the UE and without triggering an identity translation call flow toward the UDM device). This improves network performance (e.g., by optimizing a procedure associated with translating the external identifier to the internal identifier, reducing network transactions per second (TPS), reducing latency, optimizing UDR device data storage, optimizing UDR resource structure, reducing redundant call flows, and/or reducing application programming interface (API) utilization, among other examples). This also conserves resources (e.g., computing resources, memory resources, and/or networking resources, among other examples) that would have otherwise been used performing operations associated with the identity translation operation or procedure (e.g., because the UDR device can translate the external identifier of the UE to the internal identifier of the UE without communicating with other devices and/or by communicating with other network devices via fewer communications).

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
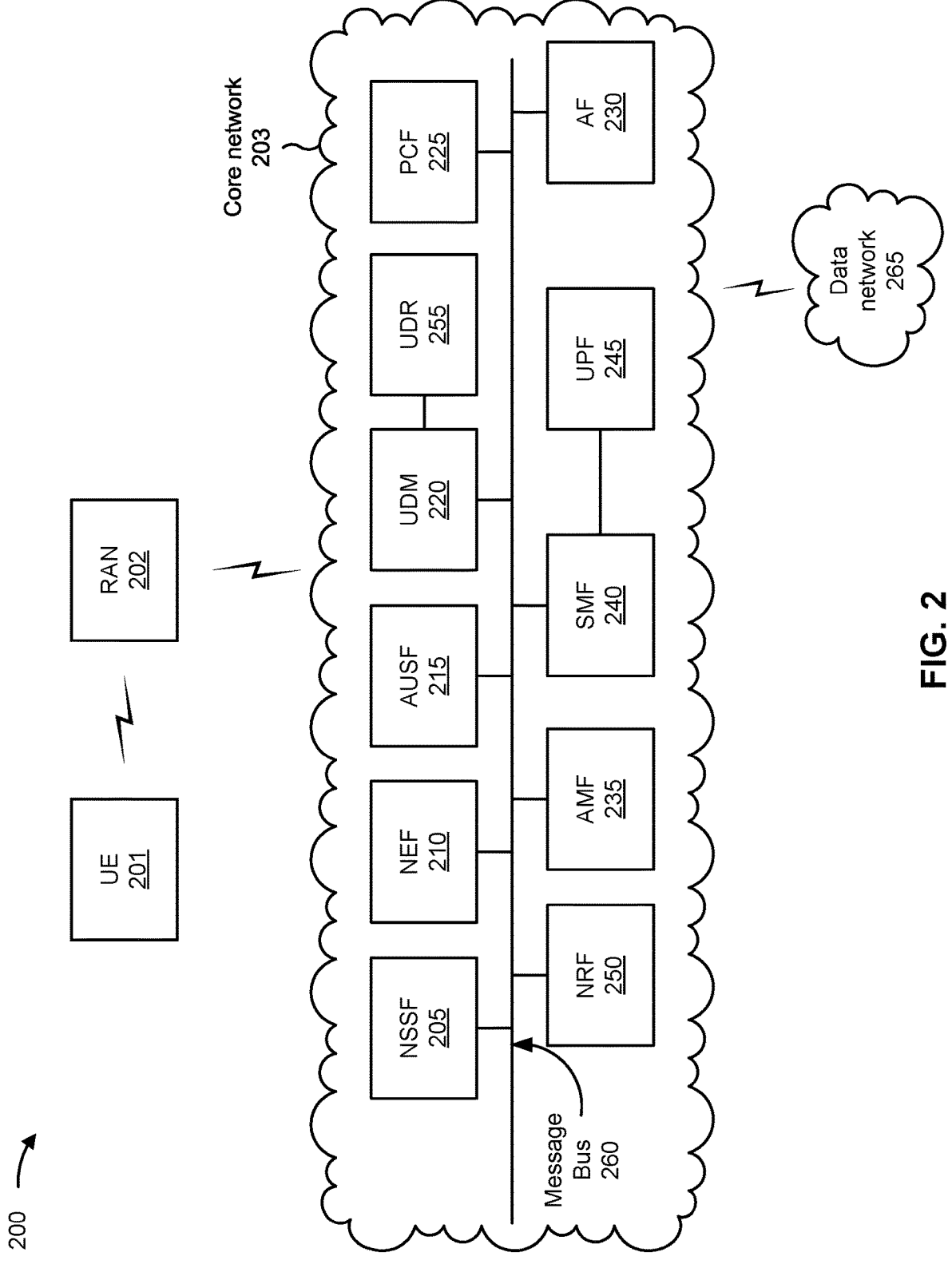
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include a UE 201, a RAN 202, a core network 203, and a data network 265. Devices and/or networks of example environment 200 may interconnect via wired connections, wireless connections, or a combination of wired and wireless connections.

UE 201 includes one or more devices capable of receiving, generating, storing, processing, and/or providing information, such as information described herein. For example, UE 201 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

RAN 202 may support, for example, a cellular radio access technology (RAT). RAN 202 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for UE 201. RAN 202 may transfer traffic between UE 201 (e.g., using a cellular RAT), one or more base stations (e.g., using a wireless interface or a backhaul interface, such as a wired backhaul interface), and/or core network 203. RAN 202 may provide one or more cells that cover geographic areas.

In some implementations, RAN 202 may perform scheduling and/or resource management for UE 201 covered by RAN 202 (e.g., UE 201 covered by a cell provided by RAN 202). In some implementations, RAN 202 may be controlled or coordinated by a network controller, which may perform load balancing, network-level configuration, and/or other operations. The network controller may communicate with RAN 202 via a wireless or wireline backhaul. In some implementations, RAN 202 may include a network controller, a self-organizing network (SON) module or component, or a similar module or component. In other words, RAN 202 may perform network control, scheduling, and/or network management functions (e.g., for uplink, downlink, and/or sidelink communications of UE 201 covered by RAN 202).

In some implementations, core network 203 may include an example functional architecture in which systems and/or methods described herein may be implemented. For example, core network 203 may include an example architecture of a fifth generation (5G) next generation (NG) core network included in a 5G wireless telecommunications system. While the example architecture of core network 203 shown in FIG. 2 may be an example of a service-based architecture, in some implementations, core network 203 may be implemented as a reference-point architecture and/or a 4G core network, among other examples.

As shown in FIG. 2, core network 203 may include a number of functional elements. The functional elements may include, for example, a network slice selection function (NSSF) 205, a network exposure function (NEF) 210, an authentication server function (AUSF) 215, a unified data management (UDM) component 220, a policy control function (PCF) 225, an application function (AF) 230, an access and mobility management function (AMF) 235, a session management function (SMF) 240, a user plane function (UPF) 245, a network repository function (NRF) 250, and/or a unified data repository (UDR) 255. For example, the first network device 102, the second network device 104, and the third network device 106 may be the NSSF 205, the NEF 210, the AUSF 215, the UDM component 220, the PCF 225, the AF 230, the AMF 235, the SMF 240, the UPF 245, the NRF 250, and/or the UDR 255.

As an example, the first network device 102 may be the AF 230, the second network device 104 may be the NEF 210, and the third network device may be the NRF 250. As another example, the first UDR device 108, the second UDR device 110, the application-UDR device 112, and the subscription-UDR device 114 may be the UDR 255. These functional elements may be communicatively connected via a message bus 260. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

NSSF 205 includes one or more devices that select network slice instances for UE 201. By providing network slicing, NSSF 205 allows an operator to deploy multiple substantially independent end-to-end networks potentially with the same infrastructure. In some implementations, each slice may be customized for different services.

NEF 210 includes one or more devices that support exposure of capabilities and/or events in the wireless telecommunications system to help other entities in the wireless telecommunications system discover network services.

AUSF 215 includes one or more devices that act as an authentication server and support the process of authenticating UE 201 in the wireless telecommunications system.

UDM 220 includes one or more devices that store user data and profiles in the wireless telecommunications system. UDM 220 may be used for fixed access and/or mobile access in core network 203. The user data and profiles may be stored in UDR 255, which includes a data repository for storing the user data and profiles.

PCF 225 includes one or more devices that provide a policy framework that incorporates network slicing, roaming, packet processing, and/or mobility management, among other examples.

AF 230 includes one or more devices that support application influence on traffic routing, access to NEF 210, and/or policy control, among other examples.

AMF 235 includes one or more devices that act as a termination point for non-access stratum (NAS) signaling and/or mobility management, among other examples.

SMF 240 includes one or more devices that support the establishment, modification, and release of communication sessions in the wireless telecommunications system. For example, SMF 240 may configure traffic steering policies at UPF 245 and/or may enforce user equipment IP address allocation and policies, among other examples.

UPF 245 includes one or more devices that serve as an anchor point for intraRAT and/or interRAT mobility. UPF 245 may apply rules to packets, such as rules pertaining to packet routing, traffic reporting, and/or handling user plane QoS, among other examples.

NRF 250 includes one or more devices that provide a record of network functions available in the core network 203 and/or a profile of network functions and/or services that are supported by the network functions. NRF 250 may support registration of network function instances and/or notifications associated with registrations of the network functions to other network functions. NRF 250 may support service discovery functions, which enables other network functions to obtain information regarding available network functions that can support one or more services.

Message bus 260 represents a communication structure for communication among the functional elements. In other words, message bus 260 may permit communication between two or more functional elements.

Data network 265 includes one or more wired and/or wireless data networks. For example, data network 265 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
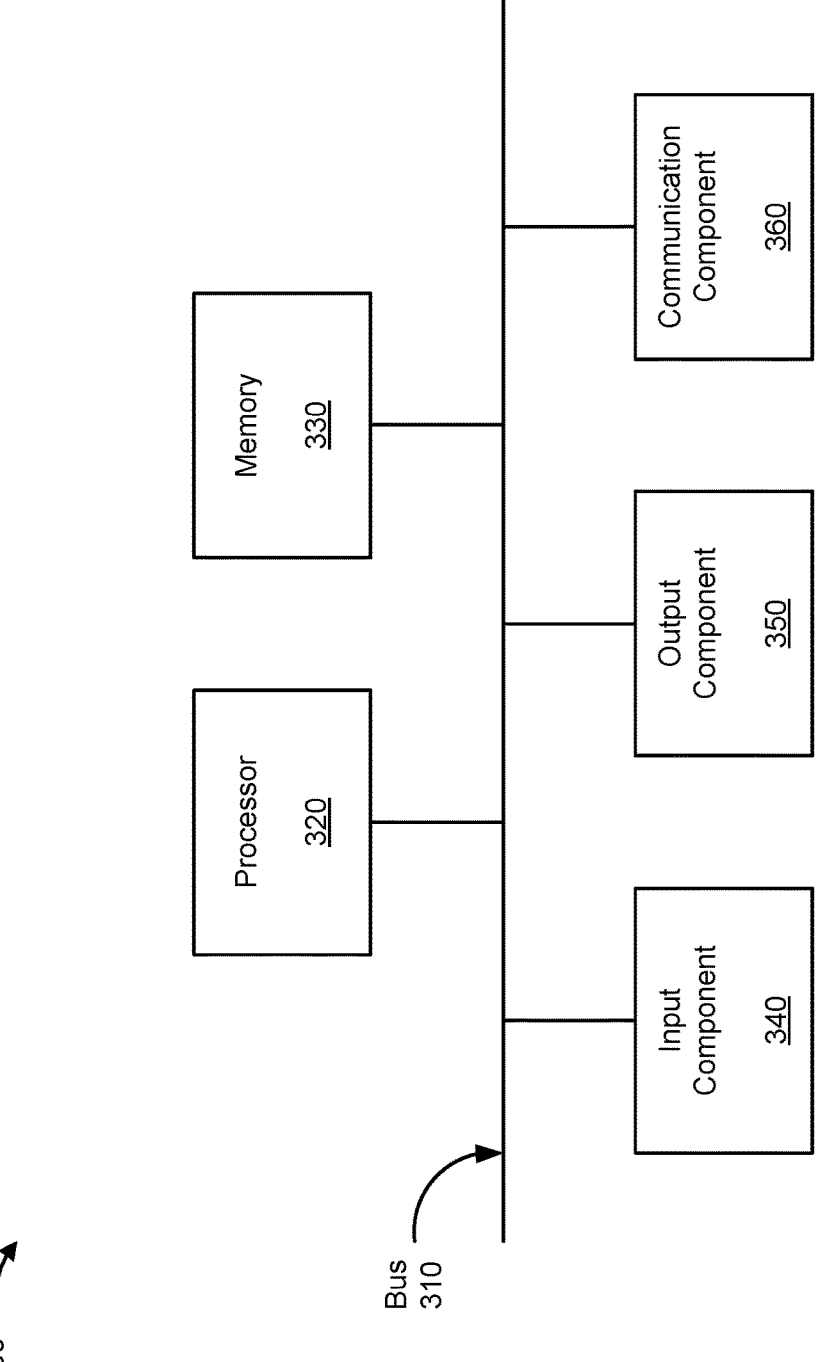
FIG. 3 is a diagram of example components of a device associated with an optimized identity translation flow.

FIG. 3 is a diagram of example components of a device 300 associated with an optimized identity translation flow. The device 300 may correspond to the NSSF 205, the NEF 210, the AUSF 215, the UDM component 220, the PCF 225, the AF 230, the AMF 235, the SMF 240, the UPF 245, the NRF 250, and/or the UDR 255. In some implementations, the NSSF 205, the NEF 210, the AUSF 215, the UDM component 220, the PCF 225, the AF 230, the AMF 235, the SMF 240, the UPF 245, the NRF 250, and/or the UDR 255 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
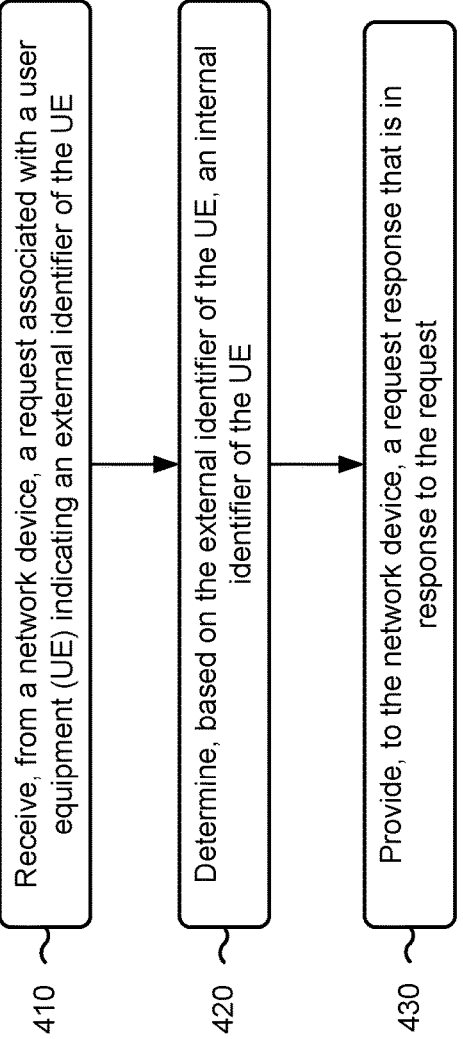
FIG. 4 is a flowchart of an embodiment of a process associated with an optimized identity translation flow.

FIG. 4 is a flowchart of an example process 400 associated with an optimized identity translation flow. In some implementations, one or more process blocks of FIG. 4 may be performed by a UDR device (e.g., the first UDR device 108, the second UDR device 110, the application-UDR device 112, and/or the subscription-UDR device 114). In some implementations, one or more process blocks of FIG. 4 may be performed by another device or a group of devices separate from or including the UDR device, such as an NSSF (e.g., the NSSF 205), an NEF (e.g., the NEF 210), an AUSF (e.g., the AUSF 215), a UDM component (e.g., the UDM component 220), a PCF (e.g., the PCF 225), an AF (e.g., the AF 230), an AMF (e.g., the AMF 235), an SMF (e.g., the SMF 240), a UPF (e.g., the UPF 245), an NRF (e.g., the NRF 250), and/or a UDR (e.g., the UDR 255).

Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving, from a network device, a request associated with a UE indicating an external identifier of the UE (block 410). For example, the UDR device may receive, from a network device, a request associated with a UE indicating an external identifier of the UE, as described above. The external identifier may be a GPSI.

In some implementations, the UDR device includes a subscription data resource that includes identity data that is associated with the UE. The identity data indicates the internal identifier of the UE. As an example, determining, by the UDR device and based on the external identifier of the UE, the internal identifier of the UE comprises correlating, based on the identity data, the external identifier with the internal identifier of the UE.

For example, the request associated with the UE is associated with at least one of application data, policy data, structured data for exposure, or group identifier mapping data. In some implementations, the request associated with the UE is at least one of an application triggering service request, an SMS request, an external parameter provisioning service request, and/or an AF-specific UE identifier retrieval service request. As an example, the request associated with the UE is based on a service request associated with the UE.

As further shown in FIG. 4, process 400 may include determining, based on the external identifier of the UE, an internal identifier of the UE (block 420). For example, the UDR device may determine, based on the external identifier of the UE, an internal identifier of the UE, as described above. As an example, determining, by the UDR device and based on the external identifier of the UE, the internal identifier of the UE includes transmitting a request to receive the internal identifier of the UE. The request to receive the internal identifier of the UE indicates the external identifier of the UE, and obtaining, from the different UDR device, an indication of the internal identifier of the UE. The internal identifier may be a SUPI.

As another example, determining, by the UDR device and based on the external identifier of the UE, the internal identifier of the UE comprises obtaining identity data that is included in subscription data associated with the UE. The identity data indicates the internal identifier of the UE. The subscription data is included in a subscription data resource of the UDR device, and identifying, based on the identity data, the internal identifier of the UE.

As further shown in FIG. 4, process 400 may include providing, to the network device, a request response that is in response to the request (block 430). For example, the UDR device may provide, to the network device, a request response that is in response to the request. The request response indicates information identified via the internal identifier of the UE, as described above.

For example, the request response indicates information identified via the internal identifier of the UE. As an example, the request associated with the UE is a request to receive application data associated with the UE. As another example, the request response includes the application data associated with the UE and the internal identifier of the UE.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flowchart of an example process 500 associated with an optimized identity translation flow. In some implementations, one or more process blocks of FIG. 5 may be performed by a network device (e.g., the second network device 104). In some implementations, one or more process blocks of FIG. 5 may be performed by another device or a group of devices separate from or including the network device, such as an NSSF (e.g., the NSSF 205), an NEF (e.g., the NEF 210), an AUSF (e.g., the AUSF 215), a UDM component (e.g., the UDM component 220), a PCF (e.g., the PCF 225), an AF (e.g., the AF 230), an AMF (e.g., the AMF 235), an SMF (e.g., the SMF 240), a UPF (e.g., the UPF 245), and/or an NRF (e.g., the NRF 250). Additionally, or alternatively, one or more process blocks of FIG. 5 may be performed by one or more components of device 300, such as processor 320, memory 330, input component 340, output component 350, and/or communication component 360.

As shown in FIG. 5, process 500 may include transmitting, to a UDR device, a request to receive information associated with a UE that is obtainable via an internal identifier of the UE (block 510). For example, the network device may transmit, to a UDR device, a request to receive information associated with a UE that is obtainable via an internal identifier of the UE. The request to receive the information associated with the UE does not indicate the internal identifier of the UE. The request to receive the information associated with the UE indicates an external identifier of the UE, as described above. As an example, the request to receive the information associated with the UE does not indicate the internal identifier of the UE. As another example, the request to receive the information associated with the UE indicates an external identifier of the UE.

As further shown in FIG. 5, process 500 may include receiving, from the UDR device and based on the request to receive the information associated with the UE, a request response that includes an indication of the information associated with the UE (block 520). For example, the network device may receive, from the UDR device and based on the request to receive the information associated with the UE, a request response that includes an indication of the information associated with the UE, as described above.

For example, the internal identifier is indicated by identity data associated with the UE. As an example, the request to receive the information associated with the UE is associated with at least one of application data, policy data, structured data for exposure, or group identifier mapping data. As another example, the request to receive the information associated with the UE is associated with at least one of an application triggering service request, an SMS request, an external parameter provisioning service request, and/or an AF-specific UE identifier retrieval service request.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a unified data repository (UDR) device and from a network device, a request associated with a user equipment (UE) indicating an external identifier of the UE;

determining, by the UDR device, whether the external identifier corresponds to identity data;

determining, by the UDR device and based on the determination, an internal identifier of the UE by translating the external identifier of the UE; and providing, by the UDR device, a request response that is in response to the request, wherein the request response indicates information identified via the internal identifier of the UE, and wherein the request response includes application data associated with the UE and the internal identifier of the UE.

2. The method of claim 1, wherein the UDR device includes a subscription data resource that includes identity data that is associated with the UE, wherein the identity data indicates the internal identifier of the UE.

3. The method of claim 1, wherein determining the internal identifier of the UE comprises:

transmitting, by the UDR device to a second UDR device, a request to receive the internal identifier of the UE, wherein the request to receive the internal identifier of the UE indicates the external identifier of the UE; and obtaining, by the UDR device and from the second UDR device, an indication of the internal identifier of the UE.

4. The method of claim 1, wherein determining the internal identifier of the UE comprises:

obtaining identity data that is included in subscription data associated with the UE, wherein the identity data indicates the internal identifier of the UE, and wherein the subscription data is included in a subscription data resource of the UDR device; and identifying, by the UDR device and based on the identity data, the internal identifier of the UE.

5. The method of claim 1, wherein the request associated with the UE is a request to receive application data associated with the UE.

6. The method of claim 1, wherein the request associated with the UE is associated with at least one of:

application data, policy data, structured data for exposure, or group identifier mapping data.

7. The method of claim 1, wherein the request associated with the UE is at least one of:

an application triggering service request, a short message service (SMS) service request, or an external parameter provisioning service request.

8. The method of claim 1, wherein the request associated with the UE is based on a service request associated with the UE.

9. A network device, comprising:

one or more processors configured to:

transmit, to a unified data repository (UDR) device, an identity translation request to receive information associated with a user equipment (UE) that is obtainable via an internal identifier of the UE, wherein the identity translation request associated with the UE is a request to receive application data associated with the UE, wherein the identity translation request to receive the information associated with the UE does not indicate the internal identifier of the UE, wherein the identity translation request to receive the information associated with the UE indicates an external identifier of the UE, and wherein the identity translation request to receive the information associated with the UE is associated with at least one of:

structured data for exposure, or group identifier mapping data; and receive, from the UDR device and based on the identity translation request to receive the information associated with the UE, a request response that includes an indication of the information associated with the UE, wherein the request response includes the application data associated with the UE and the internal identifier of the UE.

10. The network device of claim 9, wherein the internal identifier is indicated by identity data associated with the UE.

11. The network device of claim 9, wherein the identity translation request to receive the information associated with the UE is associated with policy data.

12. The network device of claim 9, wherein the identity translation request to receive the information associated with the UE is associated with at least one of:

an application triggering service request, a short message service (SMS) service request, or an external parameter provisioning service request.

13. A non-transitory computer-readable medium storing a set of instructions, the set of instructions comprising:

one or more instructions that, when executed by one or more processors of a first unified data repository (UDR) device, cause the first UDR device to:

receive, from a second UDR device, an identity translation request associated with a user equipment (UE);

wherein the identity translation request associated with the UE identifies the UE via at least one of:

an external identifier of the UE, or an internal identifier of the UE; and translate, based on the identity translation request associated with the UE, at least one of:

the external identifier of the UE into the internal identifier of the UE, or the internal identifier of the UE into the external identifier of the UE.

14. The non-transitory computer-readable medium of claim 13, wherein the instructions that cause the first UDR device to translate, based on the identity translation request associated with the UE, the at least one of the external identifier of the UE into the internal identifier of the UE, or the internal identifier of the UE into the external identifier of the UE, cause the first UDR device to:

map at least one of:

the external identifier to the internal identifier that is included in a subscription data resource of the first UDR device, or the internal identifier that is included in the subscription data resource of the first UDR device to the external identifier.

15. The non-transitory computer-readable medium of claim 13, wherein the first UDR device is a subscription-UDR device, and wherein the second UDR device is an application-UDR device.

16. The non-transitory computer-readable medium of claim 13, wherein the identity translation request includes an attribute indicating that identity translation is to be performed by the first UDR device, and wherein the attribute is included in at least one of:

a Hypertext Transfer Protocol (HTTP) header associated with the identity translation request, or a JavaScript Object Notation (JSON) payload associated with the identity translation request.

17. The non-transitory computer-readable medium of claim 13, wherein the internal identifier is indicated by identity data associated with the UE.

18. The non-transitory computer-readable medium of claim 13, wherein the identity translation request associated with the UE is based on a service request associated with the UE.

19. The non-transitory computer-readable medium of claim 13, wherein the identity translation request associated with the UE is associated with at least one of:

application data, policy data, structured data for exposure, or group identifier mapping data.

20. The non-transitory computer-readable medium of claim 13, wherein the external identifier of the UE includes a generic public subscription identifier (GPSI), and wherein the internal identifier of the UE includes a subscription permanent identifier (SUPI).

* * * * *